US010261823B2

(12) United States Patent
Abali et al.

(10) Patent No.: US 10,261,823 B2
(45) Date of Patent: Apr. 16, 2019

(54) AGILE VM LOAD BALANCING THROUGH MICRO-CHECKPOINTING AND MULTI-ARCHITECTURE EMULATION

(71) Applicant: INTERNATIONAL BUSINESS MACHINES CORPORATION, Armonk, NY (US)

(72) Inventors: Bulent Abali, Tenafly, NJ (US); Michael R. Hines, White Plains, NY (US); Gokul B. Kandiraju, Tarrytown, NY (US); Jack L. Kouloheris, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/850,958

(22) Filed: Dec. 21, 2017

(65) Prior Publication Data
US 2018/0136964 A1 May 17, 2018

Related U.S. Application Data

(63) Continuation of application No. 15/346,842, filed on Nov. 9, 2016, now Pat. No. 9,904,571, which is a
(Continued)

(51) Int. Cl.
*G06F 9/455* (2018.01)
*G06F 9/50* (2006.01)

(52) U.S. Cl.
CPC .......... *G06F 9/45558* (2013.01); *G06F 9/455* (2013.01); *G06F 9/50* (2013.01); *G06F 9/5005* (2013.01); *G06F 2009/4557* (2013.01)

(58) Field of Classification Search
CPC ............. G06F 11/1469; G06F 11/2097; G06F 11/3433; G06F 11/1466; G06F 9/5088
See application file for complete search history.

(56) References Cited

U.S. PATENT DOCUMENTS 6,795,966 B1 * 9/2004 Lim .................... G06F 11/1438
718/1
8,442,955 B2 5/2013 Al Kiswany et al.
(Continued)

OTHER PUBLICATIONS

List of IBM Patents or Patent Applications Treated as Related dated Dec. 21, 2017, 2 pages.
(Continued)

*Primary Examiner* — Brian W Wathen
(74) *Attorney, Agent, or Firm* — Tutunjian & Bitetto, P.C.; Jennifer Davis

(57) ABSTRACT

Methods and systems for agile load balancing include detecting an increased load for a first primary virtual machine (VM) on a first node that has a plurality of additional primary VMs running on a processor; deactivating one or more of the additional primary VMs, reducing said one or more deactivated VMs to a secondary state, to free resources at the first node for the first primary VM; and activating secondary VMs, located at one or more additional nodes, that correspond to the one or more deactivated VMs, raising said secondary VMs to a primary state. Activation and deactivation through micro-checkpointing may involve nodes of different CPU architectures during transient periods of peak load.

18 Claims, 4 Drawing Sheets

Related U.S. Application Data continuation of application No. 14/280,824, filed on May 19, 2014, now Pat. No. 9,513,939.

(56) References Cited

U.S. PATENT DOCUMENTS

| | | | |
|---|---|---|---|
| 8,868,711 B2 | 10/2014 | Skjolsvold et al. | |
| 9,600,332 B2 | 3/2017 | Patel et al. | |
| 2009/0300210 A1 | 12/2009 | Ferris | |
| 2013/0042150 A1 | 2/2013 | McNeeney | |
| 2014/0173213 A1* | 6/2014 | Beveridge | G06F 3/061 |
| | | | 711/130 |

OTHER PUBLICATIONS

SPI DST et al. "Virtual Memory Management for Database Systems" ip.com Prior Art Database Technical Disclosure. Mar. 2007. (27 Pages).

IBM et al. "Technique for Virtual Memory Architecture to Support Checkpoint and Rollback Recovery" ip.com Prior Art Database Technical Disclosure. Apr. 2005. (8 Pages).

* cited by examiner

AGILE VM LOAD BALANCING THROUGH MICRO-CHECKPOINTING AND MULTI-ARCHITECTURE EMULATION

BACKGROUND

Technical Field

The present invention relates to system virtualization and, more particularly, to agile virtual machine load balancing.

Description of the Related Art

Virtualization is evolving as a key consolidation technology and is part of the foundation of cloud computing. The ability to create and manage virtual machines (VMs) has become a necessity for data center management. Cloud providers typically use these techniques to consolidate multiple applications or VMs onto a single node to minimize their costs and to take maximum advantage of virtualization. At the same time, cloud consumers expect VMs to obey desired service level agreements (SLAs) to satisfy their own clients' needs. SLAs typically include performance SLAs in addition to others, such as availability, security, etc. This in turn means that providers provision resources to the VMs to handle varying loads, including peak loads. However, load variation on the application cannot generally be known beforehand. If resources are provisioned to handle a certain amount of load, then VM performance may degrade during peak loads, thus violating the promised SLAs.

One solution to this problem has been to over-provision resources to the VMs, by providing enough extra resources to the VM to handle peak loads. This approach has a drawback in that the resources in the system are under-utilized except when they are at peak load, which results in a higher cost to providers, which need to use more physical resources to provide the resources to the over-provisioned VMs. Another conventional solution is to migrate secondary VMs to a different machine when one VM on the same node reaches peak loads. However, migrating a VM may need significant resources and time and may even degrade the performance of the VM that is at peak load if resources such as processing and network resources are used for migration.

SUMMARY

A method for load balancing includes detecting an increased load for a first primary virtual machine (VM) on a first node that has a plurality of additional primary VMs running on a processor; deactivating one or more of the additional primary VMs, reducing said one or more deactivated VMs to a secondary state, to free resources at the first node for the first primary VM; and activating secondary VMs, located at one or more additional nodes, that correspond to the one or more deactivated VMs, raising said secondary VMs to a primary state.

A method for load balancing includes periodically micro-checkpointing a first primary VM and one or more additional primary VMs during execution of said primary VMs to maintain corresponding secondary VMs at one or more additional nodes; detecting an increased load for the first primary virtual machine (VM) on the first node that has a plurality of additional primary VMs running on a processor; deactivating one or more of the additional primary VMs, reducing said one or more deactivated VMs to a secondary state, to free resources at the first node for the first primary VM; and activating secondary VMs, located at one or more additional nodes having a hardware architecture incompatible with that of the first node, that correspond to the one or more deactivated VMs, raising said secondary VMs to a primary state on an emulation layer that emulated the hardware architecture of the first node.

A load balancing node includes a processor configured to run a plurality of primary virtual machines (VMs); and a load balancer configured to detect an increased load for a first primary VM, to deactivate one or more additional primary VMs, reducing said one or more deactivated VMs to a secondary state, to free resources for the first primary VM, and to communicate with one or more additional nodes to activate secondary VMs that correspond to the one or more deactivated VMs, raising said secondary VMs to a primary state.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide agile migration of virtual machines (VMs) to handle peak-load situations and do load-balancing by using adaptive micro checkpointing. In the present embodiments, certain VMs (referred to as primary VMs) that are consolidated on a single node have a corresponding inactive secondary VM that is replicated onto another node and that is periodically updated by the primary VM. The secondary VM stays in a passive mode until it is activated by a load balancer. The load balancer component monitors the loads on the respective VMs on a node and dynamically switches processing from a primary VM to a secondary VM based on the load currently seen on the nodes. To make these changes in an adaptive manner, the load balancer uses metrics that include, e.g., application metrics such as transactions per second and operating system metrics such as processor utilization.

Figure 1:
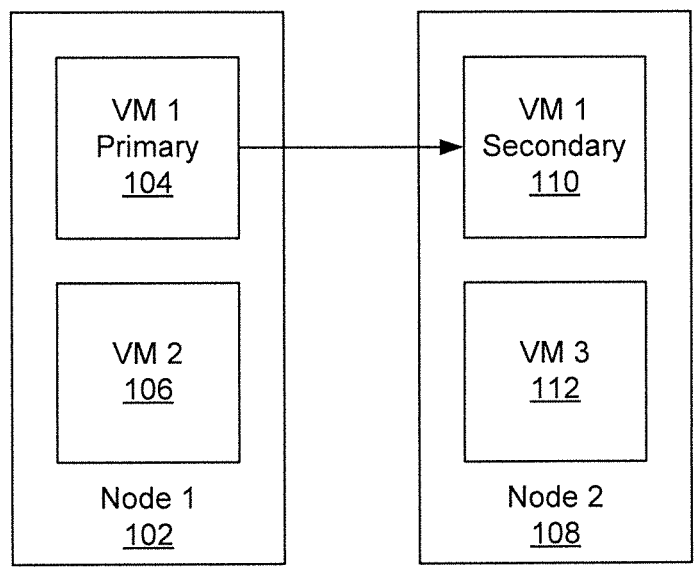
FIG. 1 is a block diagram of a load balancing system in accordance with the present principles.

Referring now to the drawings in which like numerals represent the same or similar elements and initially to FIG. 1, a virtualization system is shown that includes a first physical node 102 and a second physical node 108. The first node 102 has multiple VMs, including a first VM 104 and a second VM 106. The first VM 104 has a primary VM 104 on the first node and a secondary VM 110 on the second node 108. The second node 108 also has a third VM 112.

During normal operation, the first VM 104, second VM 106, and third VM 112 run at the same time on their respective nodes. The first VM's primary iteration 104 runs on the first node 102 and periodically provides updated state information to the secondary iteration 110 on the second node 108 through micro-checkpointing. Micro-checkpointing may be understood as a live migration that never ends, as updated state information is sent periodically to keep the VMs synchronized. These updates can be sent at different rates for different types of application, where some applications will benefit from sending cold and hot portions of memory in advance, before the load peaks.

An appropriate checkpoint frequency can be determined by monitoring current performance over time, such as through a sustained, observed, transient peak in CPU utilization or by an unacceptable drop (according to the aforementioned SLA) in application throughput or latency, which might violate the application's SLA. Both high frequencies and low frequencies can harm an application: if the frequency is too low, the IO path from inside the VM to the outside (such as a network transmission) can "appear" to be too slow. If it is too high, the micro-checkpointing logic itself may take up too many resources (such as processing and network resources) away from the VM itself. Thus, an appropriate frequency would be adjusted over time according to the current performance monitored.

At some point in the operation of the system, the second VM 106 increases its processing needs. When the second VM 106 approaches peak load, such that the first node 102 cannot adequately serve both VMs at once. At this point, the secondary iteration of the first VM 110 activates using the most recent up-to-date (fault tolerant) micro-checkpoint that was successfully generated. No additional state needs to be synchronized after the peak in load is detected. This allows the first node 102 to quickly devote additional resources to the second VM 106 without compromising SLAs related to the first VM 104.

Figure 2:
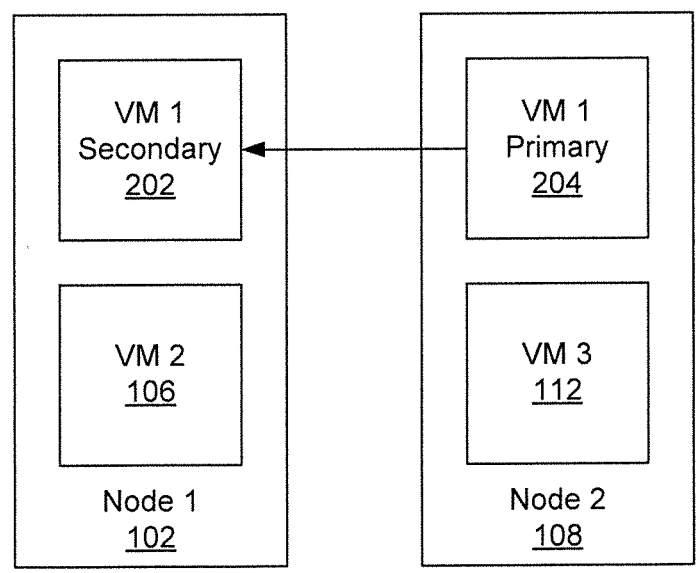
FIG. 2 is a block diagram of a load balancing system in accordance with the present principles.

Referring now to FIG. 2, the system is shown after the first VM is switched from the first node 102 to the second node 108. When VMs are switched, the secondary iteration of the first VM 110 becomes the new primary VM 204. The original primary VM 104 becomes the new secondary VM 202, with the new primary VM 204 providing state updates to the new secondary VM 202. Updating the secondary VM 202 on the first node 202 uses fewer resources than running the primary VM 104 did, which frees resources for the second VM 106 to run at peak load. The primary and secondary VMs can be switched again if the loads change.

It should be noted that, although only two nodes are shown, any number of nodes may be used and a given VM may have secondary VMs on multiple other nodes. In this case, a decision is made as to which node can best accommodate the additional burden of the transferred VM. Because the secondary VMs will not consume much in the way of processing resources, a given node may also accommodate multiple secondary VMs.

To keep load balancing agile, such that VM location can be changed quickly, the present embodiments may also optionally employ processor architecture emulation. For example, if the first node 102 runs on a first processor architecture, and the second node 108 runs on a second processor architecture, the second node 108 may provide an emulation layer that allows a VM from the first node 102 to be seamlessly transferred. This allows diverse processing nodes to be employed to aid in load balancing, which may be particularly advantageous in cloud computing environments that provide a wide variety of architectures. When loads on the native architecture nodes returns to normal, the emulated VMs may be switched back to nodes at which they will run more efficiently.

Figure 3:
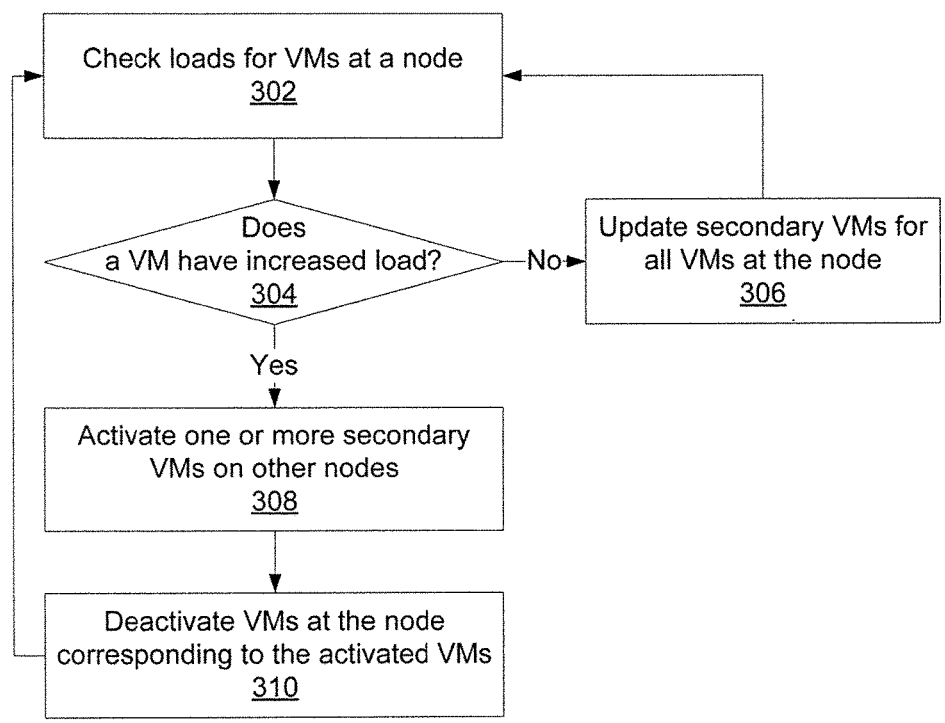
FIG. 3 is a block/flow diagram of a method for agile load balancing in accordance with the present principles.

Referring now to FIG. 3, a method for agile load balancing is shown. Block 302 begins by checking the loads for each VM at a node. Block 304 makes a determination as to whether one or more VMs at the node have an increased load, such that there is a risk of failing to meet one or more SLAs. This determination may include a comparison of a load level to a threshold that characterizes the resources that a VM may use without starving the loads of other VMs. It should be noted that it may also be possible for multiple VMs to increase their loads, and so a combined load may also be compared to the threshold. If no VMs have a load that exceeds this threshold, block 306 updates the state information for secondary VMs at other nodes that correspond to the primary VMs running at the node. This update may be based on a specified update frequency for each VM, as different VMs may need more or less frequent state updates.

If one or more VMs at the node have increased their loads past the threshold, processing passes to block 308 which activates one or more secondary VMs on other nodes which correspond to primary VMs other than the high-load VM(s). Block 310 then deactivates the corresponding primary VMs to free up local resources at the node, allowing the high-load VMs to run unimpeded. Processing then returns to block 302 to continue checking loads. This process is performed at each node, with communication between different nodes to determine which nodes can best handle the increased load of activating VMs. It should be noted that the VMs need not be switched back when the loads return to normal levels. Instead, the load balancing process may simply wait until the load increases elsewhere, necessitating another switch.

Figure 4:
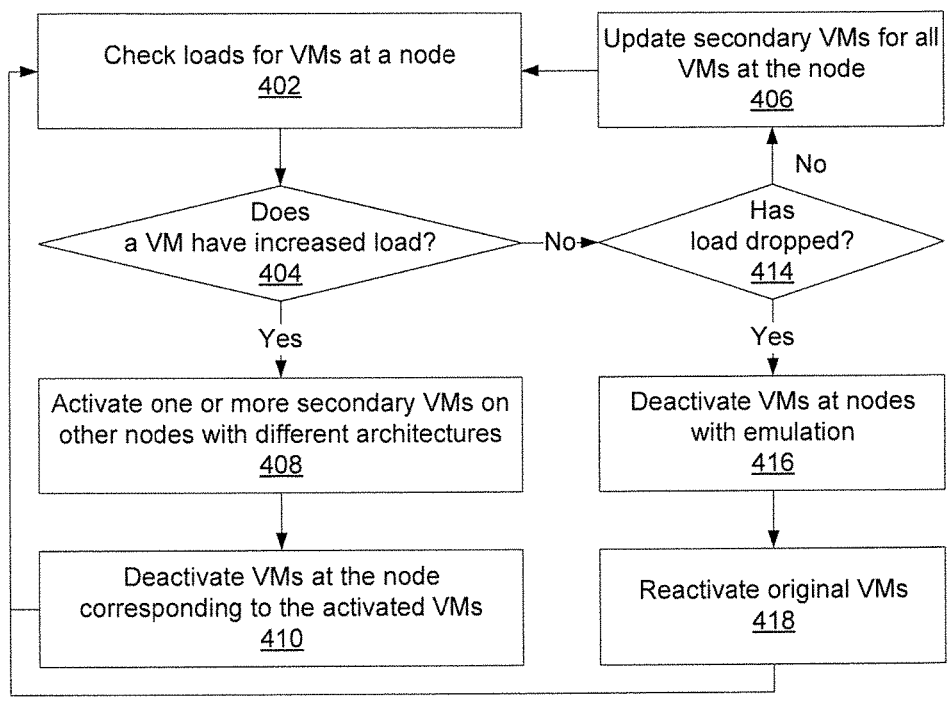
FIG. 4 is a block/flow diagram of a method for agile load balancing across disparate architectures in accordance with the present principles.

Referring now to FIG. 4, a method for multi-architecture load balancing is shown. As above, block 402 checks the load level for all of the VMs at a node. Block 404 determines whether one or more VMs have increased their loads past a threshold. If so, block 408 activates one or more secondary VMs on nodes having different architectures. These nodes cannot run the VM natively, but may emulate the original architecture. Although this is less efficient than running a VM on its native architecture, it expands the options for load balancing. Block 410 deactivates VMs at the original node that corresponds to the activated VMs and returns processing to block 402.

If no VM has a load past the threshold, block 414 determines whether the load has dropped for a VM that was previously experiencing increased load. If so, block 416 deactivates VMs at nodes with emulation. In contrast to the above examples, where VMs need not be switched back right away, multi-architecture load balancing incurs a penalty in the increased overhead needed to emulate the original architecture. Block 418 reactivates the original nodes and returns processing to block 402.

If no load increases past the threshold and there are no emulated VMs to return to their original nodes, block 406 updates secondary VMs for all VMs at the node to maintain the state of the secondary VMs for potential future activation. It is assumed that the aggregate, emulated compute resources of the secondary destination host, towards which a load balancing switch will occur, are higher than the available non-emulated compute resources of the original host, on which the overloaded VM is currently running. This means that it may be necessary for the provider (and or client) to increase cost to provide a secondary machine that is more powerful than the primary such that the decision to perform a micro-checkpointing based switch can be realized on the destination host even while the secondary is being emulated. It is also assumed that, if this cost is prohibitively high, then this embodiment provide micro-checkpointing as described above, such that one load-balanced switch can be succeeded by another switch to a non-emulated host to restore the secondary VM to a new location, such that the original non-emulated cost basis for running the VM can be maintained in the long term.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 5:
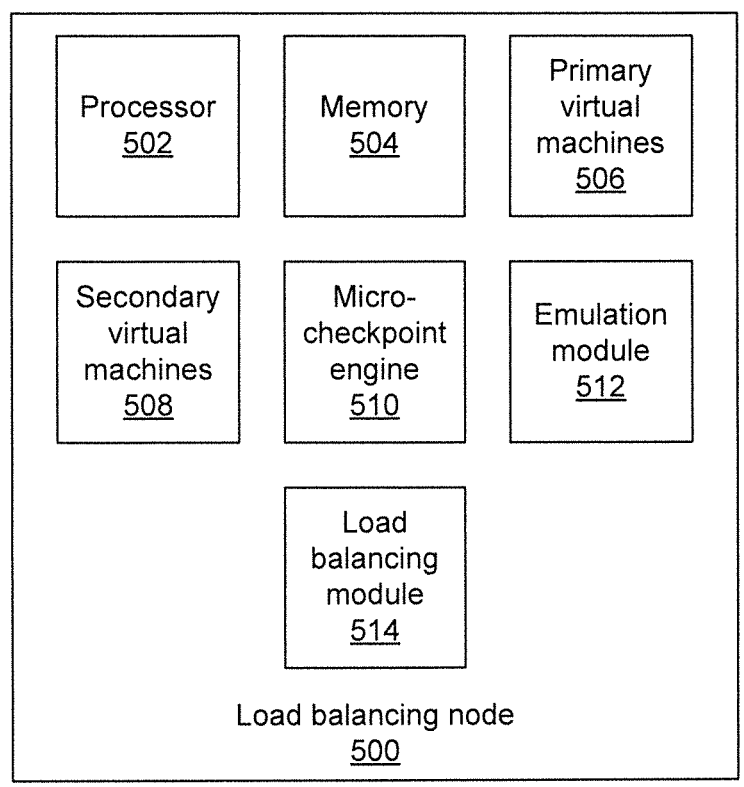
FIG. 5 is a block diagram of a load balancing node in accordance with the present principles.

Referring now to FIG. 5, a load balancing node 500 is shown. A processor 502 and memory 504 serve to store and execute primary virtual machine(s) 506 and secondary virtual machine(s) 508. The processor 502 and memory 504 thereby system resources which are consumed by the virtual machines in accordance with their respective loads. If one virtual machine demands, for example, more processing power than is available, the load balancing module 514 may trigger a reassignment of one or more virtual machine workloads to other nodes, activating the corresponding secondary virtual machines 508 on the target node and deactivating the local primary virtual machines 506 in question. It should be recognized that the load balancing module 514 need not be located at the nodes themselves but may be located at a dedicated central server or may be decentralized in only some of the nodes.

A micro-checkpoint engine 510 maintains connections between the primary virtual machine(s) 506 at the local node 500 with the corresponding secondary virtual machine(s) 508 at other nodes 500. The micro-checkpoint engine 510 supplies updated state information to the secondary virtual machines 508, in case those secondary virtual machines 508 need to be activated. In addition, the micro-checkpoint engine 510 accepts updated state information for local secondary virtual machines 508 from corresponding primary virtual machines 506 at other nodes.

As noted above, an emulation module 512 provides the ability to emulate other hardware architectures, such that virtual machines from other architectures may be temporarily run on the node 500. It is worth noting that this gives the present embodiments the ability to make use of mobile devices for load sharing as well, as such devices typically have different hardware architectures from conventional cloud devices.

In such a scenario, a primary VM would be running on the mobile device. The secondary VM would be running on a server, with the server architecture likely being different from the mobile architecture. The micro-checkpointing engine 510 would thus link the device and the server together in the event that the VM providing the mobile service to the user needs more resources than are currently available on the device. Once the load balancer determines that a mobile SLA is being violated, a switch would occur where the server would immediately take over execution as described before through micro-checkpointing, with the output or display results of the VM returned back to the mobile device. Once the load has diminished, the VM could be returned in the same way back to the device.

Having described preferred embodiments of a system and method for agile VM load balancing through micro-checkpointing and multi-architecture emulation (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for load balancing, comprising:
   detecting an increased load for a first primary virtual machine (VM) on a first node that has a plurality of additional primary VMs running on a processor;
   deactivating one or more of the additional primary VMs to free resources at the first node for the first primary VM; and
   reactivating the one or more of the additional primary VMs when a decrease in the increased load for the first primary VM is detected.

2. The method of claim 1, further comprising micro-checkpointing the first primary VM and the one or more additional primary VMs during execution of said primary VMs.

3. The method of claim 2, wherein micro-checkpointing comprises sending updated state information regarding the primary VMs to keep corresponding secondary VMs at one or more additional nodes up to date.

4. The method of claim 3, wherein micro-checkpointing is performed on a periodic basis.

5. The method of claim 1, further comprising receiving updated state information regarding primary VMs, located at one or more additional nodes, that correspond to secondary VMs at the first node.

6. The method of claim 5, further comprising updating the secondary VMs at first node in accordance with the received updated state information.

7. The method of claim 1, wherein detecting comprises comparing a resource load of the first primary VM to a threshold resource load.

8. The method of claim 1, wherein detecting comprises detecting a second primary VM that, in combination with the first primary VM, exceeds a threshold resource load.

9. The method of claim 1, further comprising activating secondary VMs including activating said VMs on additional nodes that have a hardware architecture incompatible with that of the first node and wherein said secondary VMs are activated on an emulation layer that emulates the hardware architecture of the first node.

10. The method of claim 1, further comprising:
    monitoring a resource load of the primary VMs on the first node over time; and
    adjusting a frequency of the micro-checkpointing based on the resource load of said primary VMs such that the frequency is reduced when the resource load increases.

11. A load balancing node, comprising:
    a processor configured to run a plurality of primary virtual machines (VMs); and
    a load balancer configured to detect an increased load for a first primary VM, to deactivate one or more additional primary VMs to free resources for the first primary VM, and to reactivate the one or more of the additional primary VMs when a decrease in the increased load for the first primary VM is detected.

12. The load balancing node of claim 11, further comprising a micro-checkpoint module configured to micro-checkpoint the first primary VM and the one or more additional primary VMs during execution of said primary VMs.

13. The load balancing node of claim 12, wherein the micro-checkpoint module is further configured to send updated state information regarding the primary VMs to keep corresponding secondary VMs at one or more additional nodes up to date.

14. The load balancing node of claim 11, further comprising a micro-checkpoint module configured to receive updated state information regarding primary VMs, located at one or more additional nodes, that correspond to secondary VMs at the first node.

15. The load balancing node of claim 14, wherein the micro-checkpoint module is further configured to update the secondary VMs at the first node in accordance with the received updated state information.

16. The load balancing node of claim 11, wherein the load balancer is further configured to compare a resource load of the first primary VM to a threshold resource load to detect said increased load.

17. The load balancing node of claim 11, wherein the load balancer is further configured to communicate with additional nodes that have a hardware architecture incompatible with that of the first node and wherein said secondary VMs are activated on an emulation layer that emulates the hardware architecture of the first node.

18. The load balancing node of claim 11, wherein the load balancer is further configured to:
monitor a resource load of the primary VMs on the first node over time; and
adjust a frequency of the micro-checkpointing based on the resource load of said primary VMs such that the frequency is reduced when the resource load increases.

* * * * *